(12) United States Patent
Kim

(10) Patent No.: US 8,196,490 B2
(45) Date of Patent: Jun. 12, 2012

(54) SHIFT OPERATING DEVICE FOR AUTOMATIC TRANSMISSION

(75) Inventor: Eunsik Kim, Daegu (KR)

(73) Assignee: Hyundai Motor Company, Seoul (KR)

( * ) Notice: Subject to any disclaimer, the term of this patent is extended or adjusted under 35 U.S.C. 154(b) by 512 days.

(21) Appl. No.: 12/482,922

(22) Filed: Jun. 11, 2009

(65) Prior Publication Data

US 2010/0043585 A1    Feb. 25, 2010

(30) Foreign Application Priority Data

Aug. 22, 2008   (KR) .................. 10-2008-0082440

(51) Int. Cl.
*B60K 17/10*       (2006.01)
*F16H 59/04*       (2006.01)

(52) U.S. Cl. .................. 74/473.11; 74/473.3

(58) Field of Classification Search ............... 74/473.11, 74/473.3; 200/61.88

See application file for complete search history.

(56) References Cited

U.S. PATENT DOCUMENTS

| | | | | |
|---|---|---|---|---|
| 2,152,914 | A * | 4/1939 | Price et al. | 74/335 |
| 3,326,315 | A * | 6/1967 | Richards | 180/336 |
| 3,766,793 | A * | 10/1973 | Knop | 74/335 |
| 5,156,243 | A * | 10/1992 | Aoki et al. | 192/218 |
| 6,500,092 | B2 * | 12/2002 | Syamoto | 477/99 |
| 7,571,663 | B2 * | 8/2009 | Vigil | 74/473.3 |

FOREIGN PATENT DOCUMENTS

| | | |
|---|---|---|
| JP | 2007-320374 A | 12/2007 |
| JP | 2008-187982 A | 8/2008 |
| KR | 10-2006-0068014 A | 5/2006 |
| KR | 10-0859019 B1 | 9/2008 |

* cited by examiner

*Primary Examiner* — Thomas R Hannon
*Assistant Examiner* — Phillip A Johnson
(74) *Attorney, Agent, or Firm* — Morgan, Lewis & Bockius LLP

(57) ABSTRACT

The present invention provides a dial knob pivotably mounted and a hydraulic device for operating an inhibitor switch of an automatic transmission by creating hydraulic pressure using rotational motion of the dial knob, in order to provide a shift operating device for an automatic transmission that makes it possible to reduce manufacturing cost by having a simple structure and facilitate setting a layout by reducing a space for motion of shift knob, and makes it easy for a driver to shift by turning the shift knob with a hand to reduce the driver's tiredness and improve commercial value.

7 Claims, 6 Drawing Sheets

(a)

(b)          (c)

< BEFORE BRAKE PEDAL PRESSED DOWN >

(a)

< AFTER BRAKE PEDAL PRESSED DOWN >

(b)

SHIFT OPERATING DEVICE FOR AUTOMATIC TRANSMISSION

CROSS-REFERENCE TO RELATED APPLICATION

The present application claims priority to Korean Patent Application Number 10-2008-0082440 filed Aug. 22, 2008, the entire contents of which application is incorporated herein for all purposes by this reference.

BACKGROUND OF THE INVENTION

1. Field of the Invention

The present invention relates to a shift operating device for an automatic transmission, particularly a shift operating device for an automatic transmission which is shifted when a dial type shift knob is turned by a driver.

2. Description of Related Art

A shift lever is provided near a driver's seat in a vehicle equipped with an automatic transmission for the driver to easily shift in the related art. The shift lever is pivotably mounted in a console box near the driver, such that shift is made when the driver holds and pushes or pulls the knob of the shift lever in the longitudinal direction of the vehicle.

However, the shift lever according to the related art is shifted, for example, into P-R-N-D-L, when being operated in the longitudinal direction of the vehicle, such that, according to the structure that shifts in a straight line from the P-range to the L-range in the related art, a large layout of the shift lever should be ensured. Further, when the driver holding the knob of the shift lever operates the shift lever, the driver should move the arm to long distance because the gap between the P-range and the L-range is large, which makes driver tired. Further, since the shift lever protrudes inside the vehicle, the some parts of driver' body, such as head, may hit the shift lever in a collision, such that damage due to the collision may be increased. Furthermore, when the gap between the outer surface of the console box and the knob of the shift lever is set large, the aesthetic appearance is deteriorated, whereas when it is set small, the lever ratio is reduced and more force is required to operate the shift lever.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a shift operating device for an automatic transmission that makes it possible to reduce manufacturing cost by having a simple structure and facilitate to set a layout by reducing a space for motion of shift knob, and makes it easy for a driver to shift by turning the shift knob with a hand to reduce the driver's tiredness and improve commercial value.

The present invention may include a dial knob pivotably mounted and/or a hydraulic device for operating an inhibitor switch of the automatic transmission by creating hydraulic pressure using rotational motion of the dial knob.

In various embodiments, the hydraulic device may include a first hydraulic cylinder having a piston rod connected to the inhibitor switch, a second hydraulic cylinder having a piston rod connected to the dial knob, and/or a hydraulic hose or a tube connecting the first and second hydraulic cylinder to transmit hydraulic pressure of the second hydraulic cylinder to the first hydraulic cylinder.

According to various embodiments of the shift operating device for an automatic transmission of the present invention, since shift is automatically made by a driver turning with a hand the dial knob that can turn at that place, it is possible to simplify the configuration and the shape and reduce manufacturing cost. Further, it is possible to facilitate setting a layout of a vehicle by reducing a space for the dial knob and shift operation is improved by rotational motion of the dial knob. Furthermore, even if the driver's body hits the dial knob in a collision, damage to the driver is reduced because the contact area of the body is small. In addition, because a shift lock function is provided at the P-stage, it is possible to prevent accidents, such as sudden acceleration and improve commercial value by making the best use of design characteristics.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
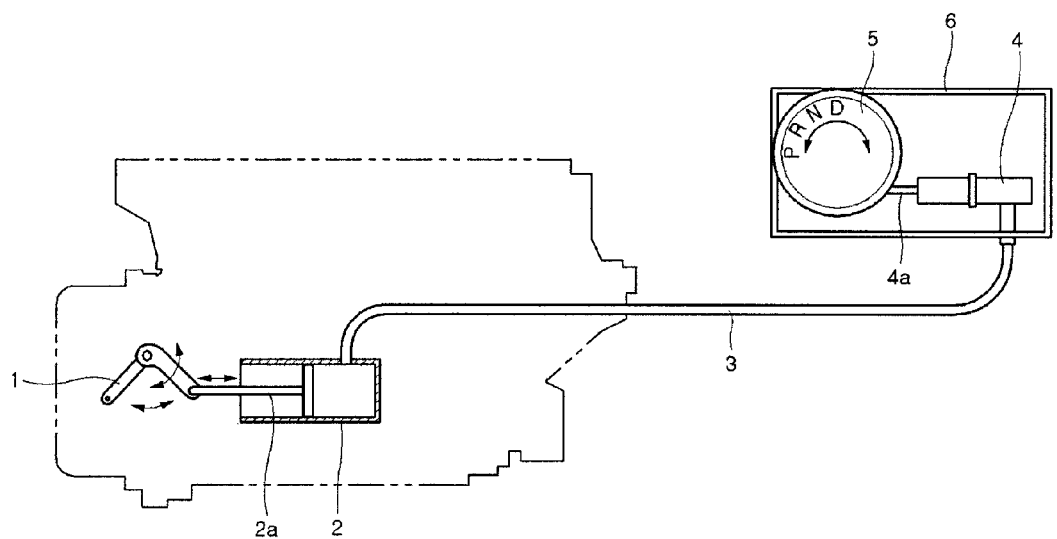
FIG. 1 is a view illustrating the configuration of an exemplary shift operating device for an automatic transmission according to the present invention.

Referring to FIG. 1, a piston rod 2a of a first hydraulic cylinder 2 is connected to an inhibitor switch 1, such that as piston rod 2a moves forward or rearward, the contact point of the inhibitor switch 1 changes and shift is made.

First hydraulic cylinder 2 is connected with a second hydraulic cylinder 4 equipped in a console box through a hydraulic hose 3 or a tube and a piston rod 4a of the second hydraulic cylinder 4 is connected with a dial knob 5, such that as dial knob turns, piston rod 4a of second hydraulic cylinder 4 creates hydraulic pressure inside second hydraulic cylinder 4 while moving forward or rearward. Further, the hydraulic pressure created in second hydraulic cylinder 4 is transmitted to first hydraulic cylinder 2 through hydraulic hose 3 or the tube, such that first hydraulic cylinder is actuated.

That is, as dial knob 5 turns, any one range of P-R-N-D ranges is selected by dial knob 5 according to the amount of turn and the turning of dial knob 5 is transmitted to second hydraulic cylinder 4 and creates hydraulic pressure, which is transmitted to first hydraulic cylinder 2 and the inhibitor switch is operated to a corresponding range, such that shift is made.

Figure 2:
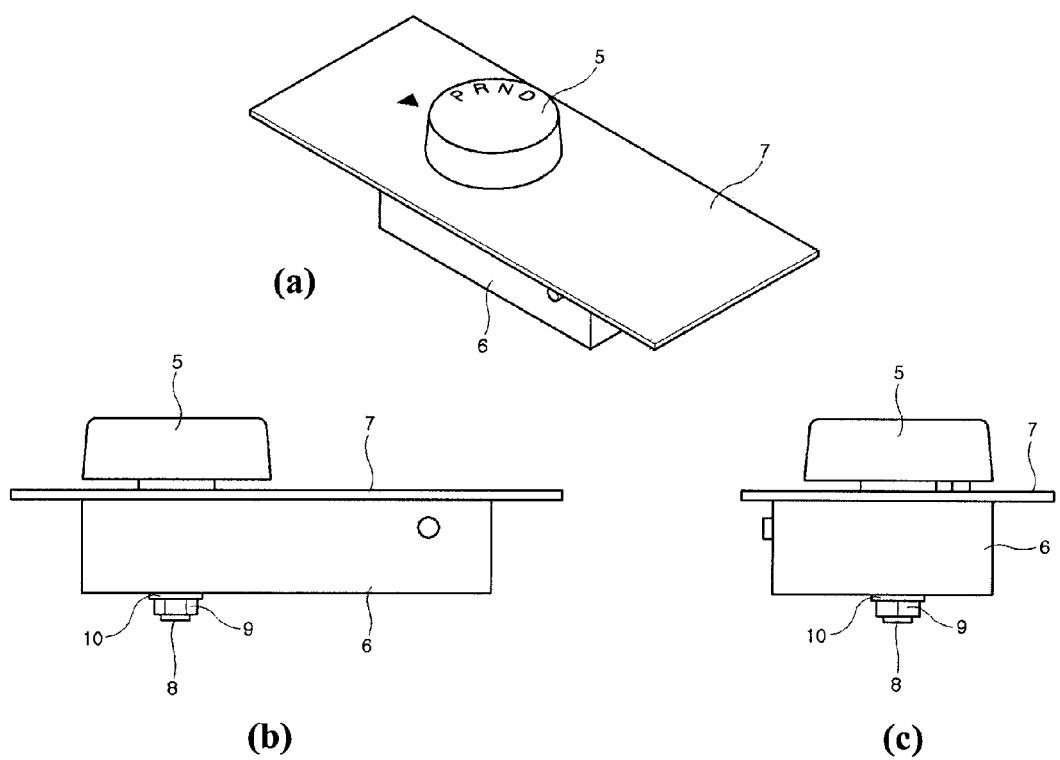
FIGS. 2(a)-(c) show a perspective view and a front view of main parts of the exemplary shift operating device for an automatic transmission according to the present invention.

Referring to FIG. 2, a console upper plate 7 is disposed on the upper portion, which is open, of a housing 6 having a rectangular box shape, dial knob 5 is pivotably disposed and supported on the console upper plate 7, P, R, N, and D ranges that show shift ranges is circumferentially marked on dial knob 5, an arrow-shaped indicator is marked on console upper plate 7, such that a driver can easily recognize the shift range selected by turning dial knob 5 through the indicator.

Dial knob 5 sequentially passes through console upper plate 7 and the bottom of housing 6 and is fitted in one end of a rotary shaft 8 to rotate with the rotary shaft, and a washer 10 is fitted on the other end of rotary shaft 8 through an assembly nut 9.

A connecting portion 4b for connecting hydraulic hose 3 to second hydraulic cylinder 4 protrudes through one side of housing 6 and hydraulic hose 3 is connected to connecting portion 4b.

Figure 3:
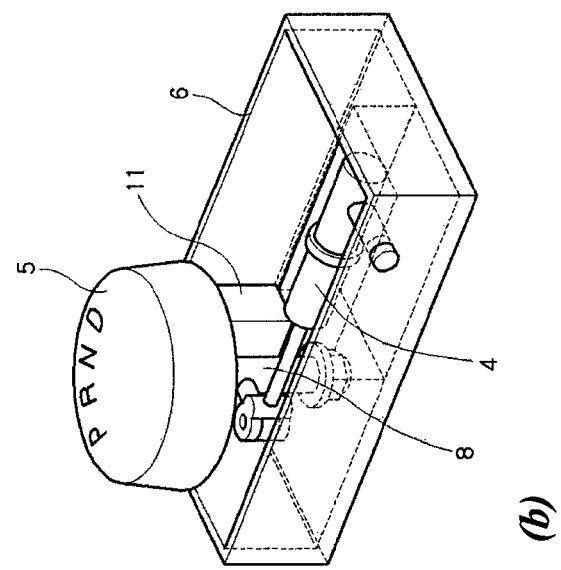
FIGS. 3(a) and (b) show exploded and assembled perspective views of the exemplary shift operating device for an automatic transmission according to the present invention.
Figure 3:
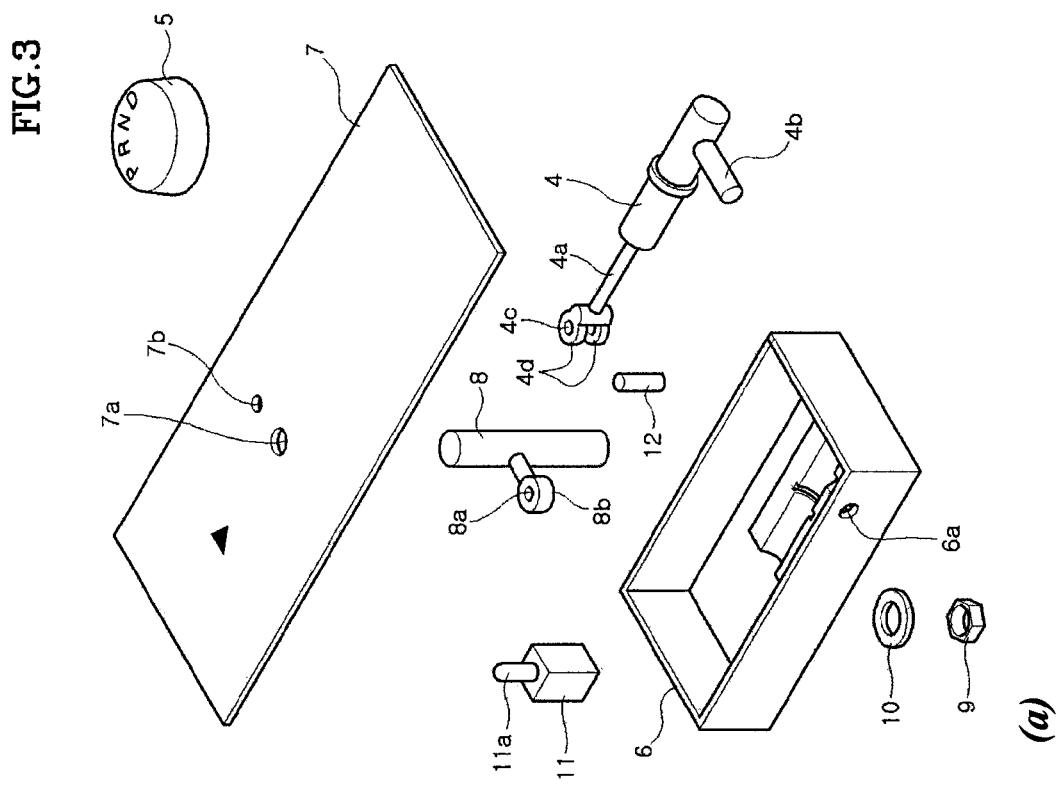

Referring to FIG. 3, a rotary shaft assembly hole 7a through which one end of rotary shaft 8 protrudes is formed through console upper plate 7 and a plunger guide hole 7b is formed near rotary shaft assembly hole 7a such that a plunger 11a of solenoid 11 passes through the console upper plate.

Figure 4:
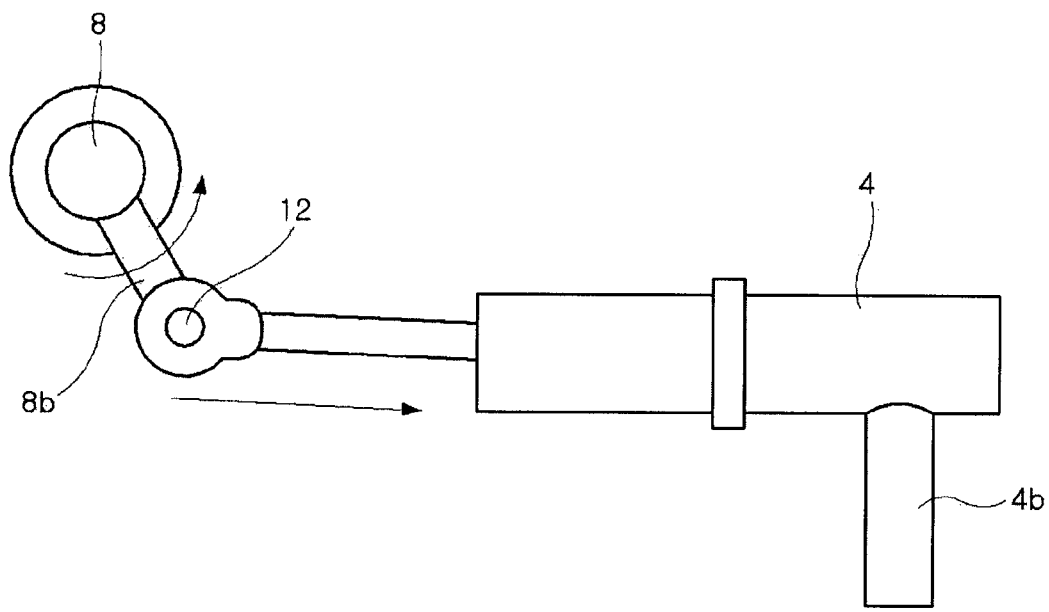
FIG. 4 is a view illustrating the operation of an exemplary hydraulic cylinder and rotary shaft according to the present invention.

A connecting boss 8b having a pin hole 8a integrally protrudes from one side of rotary shaft 8 and two connecting bosses 4d each having a pin hole 4c are integrally formed with the front end of piston rod 4a such that connecting boss 8b is inserted and fitted in the connecting bosses 44. Accordingly, by inserting connecting boss 8b of the rotary shaft between the two connecting bosses 4d of the piston and then fitting an assembly pin 12 into the pin holes, rotational motion of the rotary shaft is transmitted to the piston through the connecting bosses and the assembly pin, such that the piston reciprocates, as shown in FIG. 4.

A connecting portion assembly hole 6a through which connecting portion 4b of second hydraulic cylinder 4 is fitted is formed at one side of housing 6 and solenoid 11 is accommodated near the rotary shaft inside housing 6.

Figure 5:
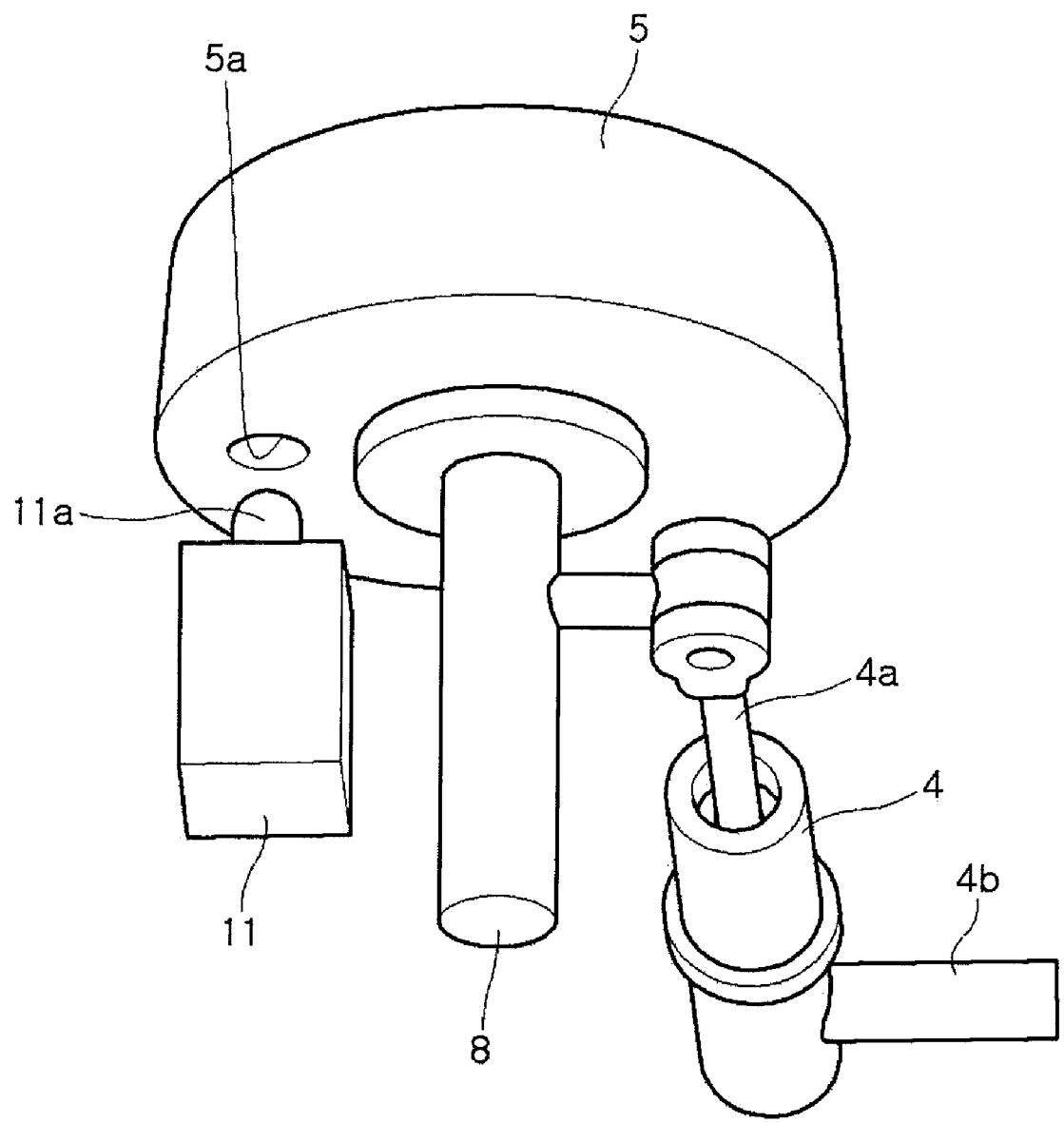
FIG. 5 is a perspective view illustrating arrangement of an exemplary dial knob and solenoid according to the present invention.

As shown in FIG. 5, a fixing groove 5a is formed on the bottom 5 of dial knob 5 to prevent turning of dial knob 5 by plunger 11a of solenoid 11 which is projected into fixing groove 5a.

Figure 6:
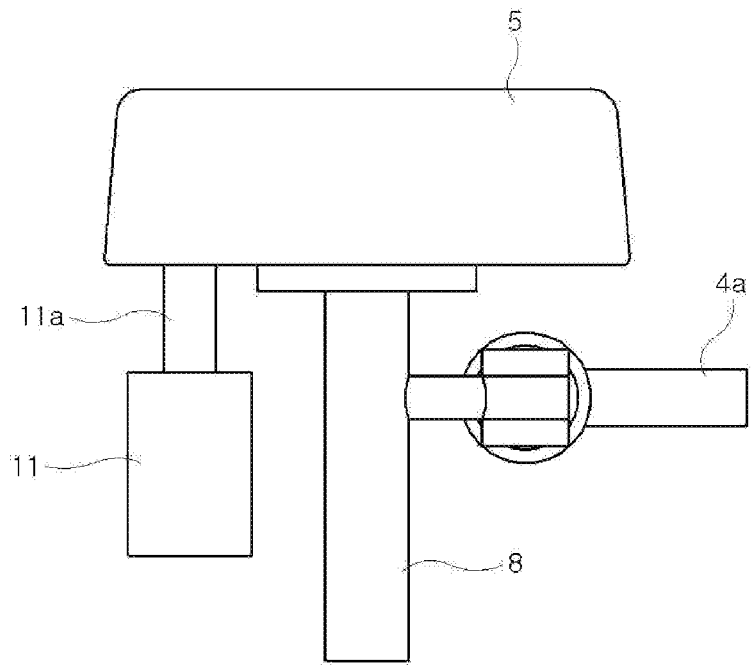
FIGS. 6(a) and (b) are views illustrating the operation of the exemplary dial knob and solenoid according to the present invention.
Figure 6:
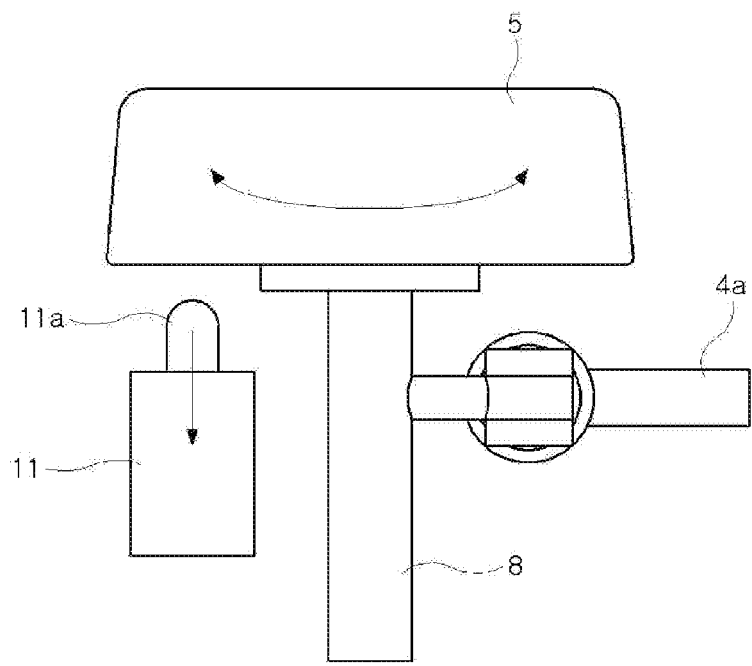

That is, as shown in FIG. 6, when dial knob 6 is positioned to the P-range, plunger 11a of solenoid 11 is projected into fixing groove 5a and the position of the dial knob is fixed to the P-range by the solenoid. Thereafter, as a driver presses down the brake pedal, control current is applied to the solenoid and the plunger is pulled out of the fixing groove, such that the driver can select a shift range by turning the dial knob. That is, a shift lock function is achieved by the solenoid.

Although the fixing groove is formed only at the position corresponding to the P-range of the dial knob in various embodiments of the invention, another fixing groove may be additionally formed at a position corresponding to the N-range to achieve a shift lock function for the N-range.

Figure 7:
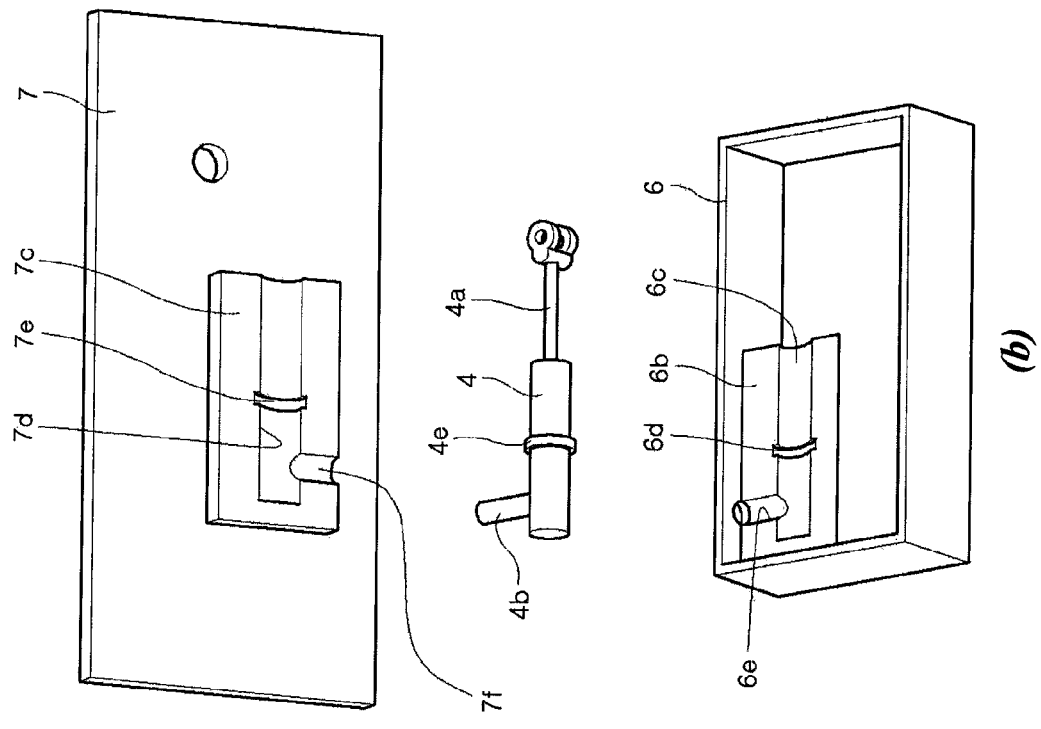
FIGS. 7(a) and (b) show exploded and assembled perspective views of an exemplary housing, console upper plate, and hydraulic cylinder according to the present invention.
Figure 7:
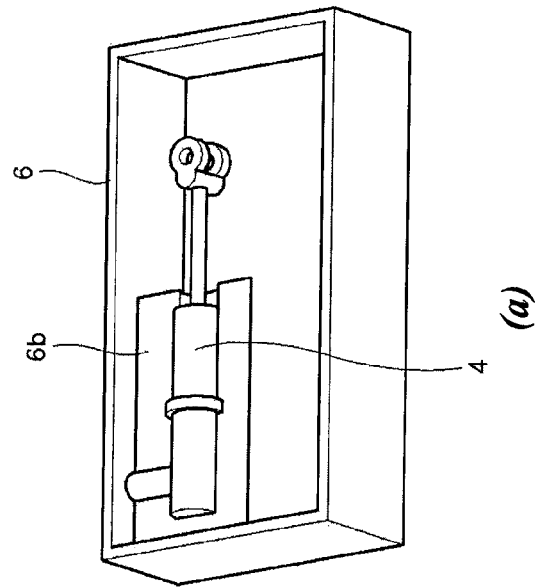

Referring to FIG. 7, a mount block 6b having a rectangular block shape is formed at a side in the housing, a semi-circular first receiving groove 6c where second hydraulic cylinder 4 is seated is formed on mount block 6b. Further, a locking groove 6d where a ring-shaped locking protrusion 4e formed around the outer circumference of second hydraulic cylinder 4 is inserted and locked, and a second receiving groove 6e where connecting portion 4b of second hydraulic cylinder 4 is inserted and seated, are formed continuously with the first receiving groove.

A mount block 7c, a first receiving groove 7d, a locking groove 7e, and a second receiving groove 7f are also formed on the inner side of the console upper plate, which covers the open upper portion of the housing, in the same shapes as mount block 6b, first receiving groove 6d, locking groove 6d, and second receiving groove 6e of the housing to correspond to them, such that second hydraulic cylinder 4 is accommodated in the housing and stably positioned by the housing and the console upper plate.

For convenience in explanation and accurate definition in the appended claims, the terms "upper", "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift operating device for an automatic transmission having an inhibitor switch, comprising:
   a pivotably mounted dial knob; and
   a hydraulic device that operates the inhibitor switch of the automatic transmission by converting creating hydraulic pressure from rotational motion of the dial knob;
   wherein the hydraulic device includes a first hydraulic cylinder having a piston rod connected to the inhibitor switch, a second hydraulic cylinder having a piston rod connected to the dial knob, and a hydraulic line connecting the first and second hydraulic cylinder to transmit hydraulic pressure of the second hydraulic cylinder to the first hydraulic cylinder.

2. The shift operating device for an automatic transmission as defined in claim 1, wherein the dial knob is pivotably supported and disposed adjacent a console upper plate and provided with shift range marks, and an indicator that indicates the shift ranges is marked on the console upper plate.

3. The shift operating device for an automatic transmission as defined in claim 2, wherein a rotary shaft is integrally rotatably connected to the dial knob, a connecting boss protrudes from the rotary shaft, a connecting boss is formed on the piston rod of the second hydraulic cylinder, the connecting bosses are connected by an assembly pin.

4. The shift operating device for an automatic transmission as defined in claim 3, wherein the console upper plate is disposed on an opening of a box-shaped housing, a rectangular block-shaped mount block where the second hydraulic cylinder is seated and supported is formed in the housing, a semicircular first receiving groove where the second hydraulic cylinder is seated is formed on the mount block, and a locking groove where a ring-shaped locking protrusion protruding from the outer circumference of the second hydraulic cylinder is inserted and locked and a second receiving groove where a connecting portion for connecting a hydraulic hose to the second hydraulic cylinder is inserted and seated are formed continuously with the first receiving groove.

5. The shift operating device for an automatic transmission as defined in claim 4, wherein a fixing groove is formed on the dial knob and a solenoid having a plunger that prevents turning of the dial knob by being inserted into the fixing groove or is pulled out of the fixing groove to allow the dial knob from turn is further provided.

6. The shift operating device for an automatic transmission as defined in claim 5, wherein a mount block, a first receiving groove, a fixing groove, and a second receiving groove, which respectively correspond to the mount block, the first groove, the fixing groove, and the second groove of the housing, are formed on the inner side of the console upper plate, and a rotary shaft assembly hole through which one end of rotary shaft protrudes and a plunge guide hole through which the plunger of the solenoid protrudes are formed through the console upper plate.

7. An automatic transmission assembly comprising:
   an automatic transmission having an inhibitor switch; and
   the shift operating device as defined in claim 1.

* * * * *